Dec. 23, 1969      L. KOVACS      3,484,897
MOLDING MACHINE WITH CLAMP UNIT AND CONTROL SYSTEM THEREFOR
Filed Oct. 26, 1967      4 Sheets-Sheet 1

INVENTOR
LLOYD KOVACS
BY
ATTORNEY

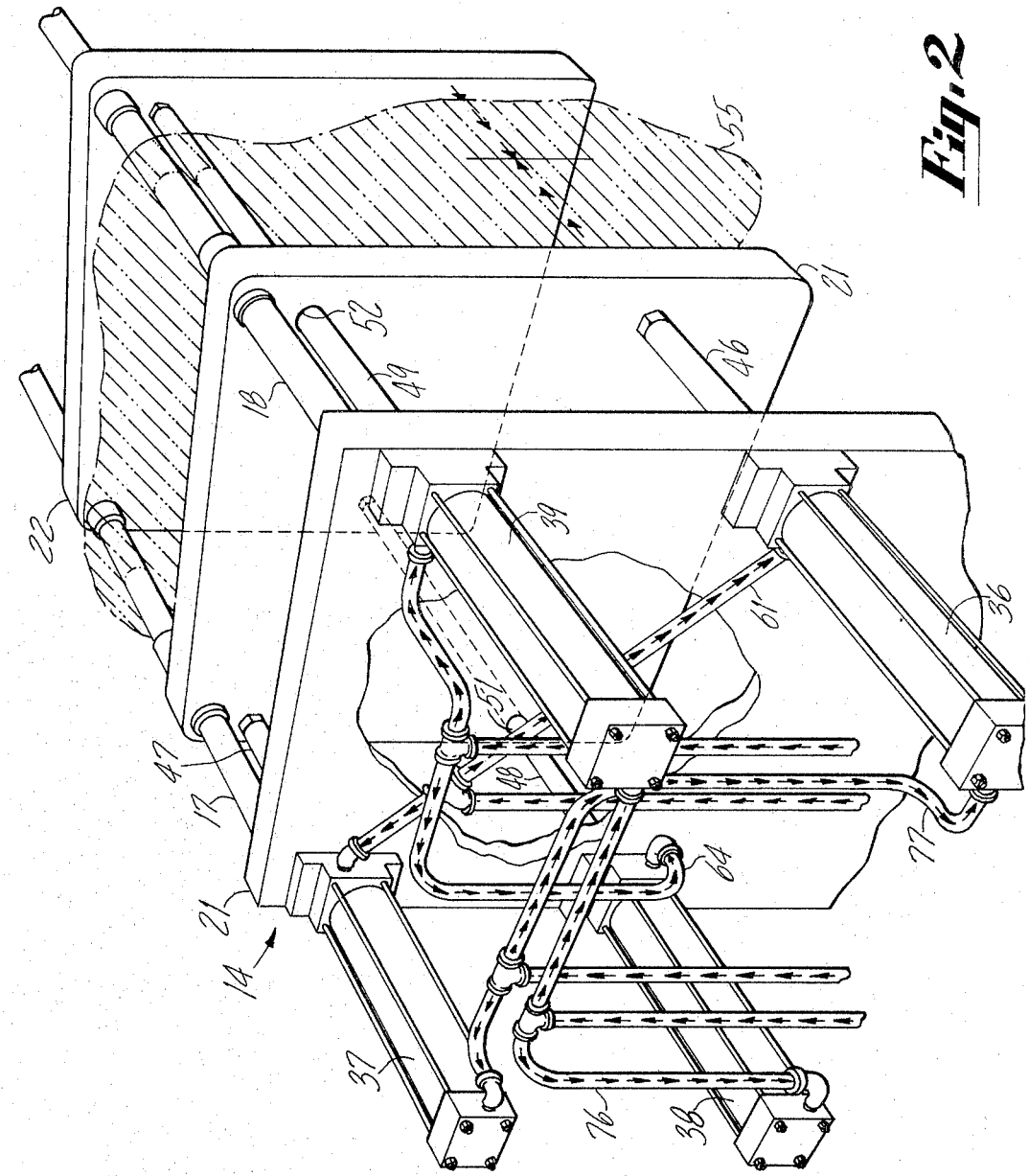

Dec. 23, 1969 L. KOVACS 3,484,897
MOLDING MACHINE WITH CLAMP UNIT AND CONTROL SYSTEM THEREFOR
Filed Oct. 26, 1967 4 Sheets-Sheet 3

INVENTOR
LLOYD KOVACS
BY
*M Portz*
ATTORNEY

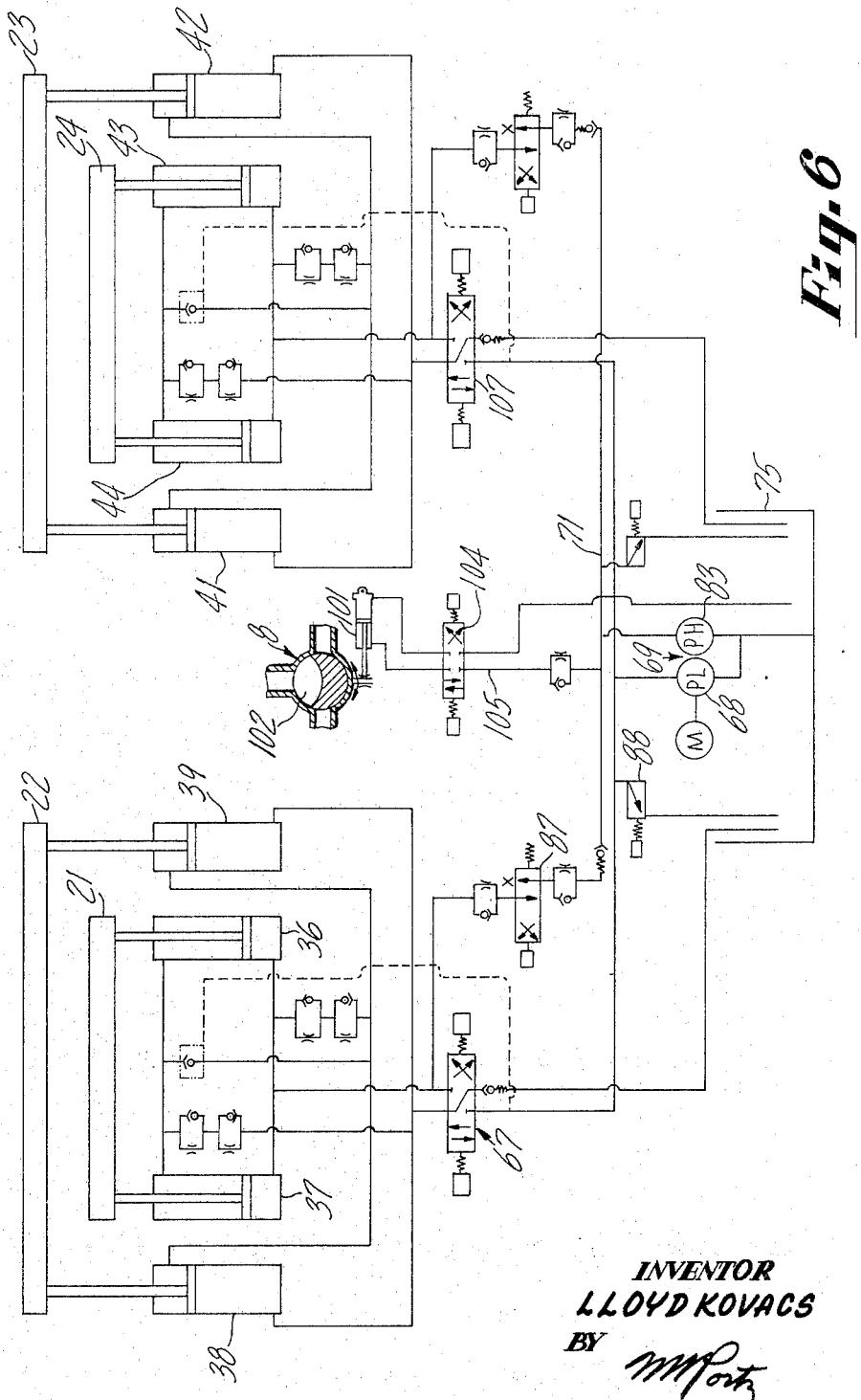

# United States Patent Office 3,484,897
Patented Dec. 23, 1969

3,484,897
MOLDING MACHINE WITH CLAMP UNIT AND
CONTROL SYSTEM THEREFOR
Lloyd Kovacs, Somerset, N.J., assignor to Midland-Ross
Corporation, Cleveland, Ohio, a corporation of Ohio
Filed Oct. 26, 1967, Ser. No. 678,365
Int. Cl. B29d 23/03
U.S. Cl. 18—5                     16 Claims

ABSTRACT OF THE DISCLOSURE

A mold clamping unit in combination with parison-feeding equipment and a control system for the unit wherein mold sections are traversed, e.g., by hydraulic cylinders disposed in coextensive parallel arrangement toward and away from a fixed plane of engagement, and wherein a hydraulic system which includes the cylinders is arranged so that one portion of the cylinders measures fluid supplied to the remaining portion of the cylinders in effecting oppositely-directed mold-closing movements of two platens. The control system is also arranged to be self-correcting whereby the platens are caused to assume a correctly indexed position at the end of each stroke.

---

The present invention is concerned essentially with molding equipment used in combination with an extruder of plastic heat-sensitive materials. The extruder is associated with one or more die heads adapted for shaping a continuous product of the material forced therethrough to a desired thinness and shape. In some blow-molding operations, for example, a parison or thin-wall tube of hot extruded plastic material issues from each die head and passes, in the case of a larger blow-molded product, between a pair of separated platens supported on parallel horizontal guides. It is now common for one extruder to feed more than one die head and thus produce a corresponding number of parisons.

In blow-molding relatively large articles, e.g., one to five gallon containers, the press structure is necessarily constructed to exert and withstand substantial forces exerted pneumatically in expanding and shaping the extruded material into conformity with the articles, and to provide sufficient platen movement to allow passage of molded articles from between mold halves separated for that purpose. A typical press unit may comprise end frames connected by parallel guides or tie-rods, a pair of platens relatively movable lengthwise of the guides, pneumatic or hydraulic cylinders supported on the outward-facing surfaces of the end frames for traversing the platens, and mold halves carried by the platens. Where high production rates are required, a single screw-type extruder may serve more than one parison-forming die. In supplying extruded material to presses of the type just described, plastic material is distributed through a manifold to die heads located at the various parison-forming stations. Such presses present some problems as to advantageous arrangement and consumption of space, especially floor area. On account of the extrusion pressures involved, the temperature-control of jacketing that may be required, and the spacing of the parison-forming stations, the manifold is a component of substantial weight and cost. Moreover, as the length of the manifold increases, there is increasing difficulty in the delivery of a thermoplastic to various die heads at the desired temperature and, especially, at uniform temperature and viscosity throughout the internal diameter of the manifold.

A primary object of the invention is to provide a molding clamp or press unit of more compact design than those now available to achieve economical floor use.

Another object is to provide a blow-molding machine of more compact over-all arrangement, especially, with respect to multiple-die-head machines to achieve shorter or more compact manifolding from an extruder to the various die heads.

It is also an object to provide a control system for a press unit capable of unusually high rates of production.

Still another object is to provide a control system which avoids accumulative error in platen movement and is automatically capable of establishing correct platen positions at the end of each platen stroke.

In brief, the above objects are achieved in a molding machine having as a basic feature, a molding clamp unit wherein cylinders for actuating a pair of platens with mold halves attached thereto for forming a molding cavity are mounted in parallel coextensive relationship on an end frame of the unit. The platens are slidably supported on a plurality of parallel guides secured to the end frame of the press. The cylinders are divided into two groups of cylinders mounted on the same face of the single end frame of the press. The molding machine includes a suitable fluid supply system, such as a motor pump unit and an oil-filled reservoir, a duct system for transferring the fluid between the pump, the cylinders, and the reservoir, and a control system for properly directing the fluid within those portions of the duct system adjacent the cylinders to cause movements of the press platens in a manner effecting a molding cycle.

In a preferred embodiment of the invention, oil is available to the cylinders at either high pressure or low pressure and the control apparatus is arranged to utilize low-pressure oil essentially for major platen movements and high-pressure oil for a small increment of mold-closing movement terminating in mold closure, and to maintain engagement of the mold halves during the actual molding operation. The control apparatus is further arranged so that upon registry of a signal indicating completion of the molding operation, valves are actuated to cause low-pressure liquid to traverse the cylinders and opposed platens through a mold-opening stroke.

In a preferred embodiment, still further economy of space is achieved in a molding clamp unit having two sets of molding platens supported on a common set of guide bars, and traversing cylinders therefor supported by respective end frame members of the unit. The regions in which respective pairs of platens reciprocate may be separated by a guide-spacing plate of minimal construction fixed to the guide bars or, optionally, with no guide-spacing plate whatsoever.

In the drawing with respect to which the invention is described below:

FIG. 2 is an enlarged perspective view of a portion of the molding clamping unit illustrated in FIG. 1;

FIG. 6 is a hydraulic diagram illustrating a hydraulic system for actuating both sets of platens of a machine such as illustrated in FIG. 1.

Figure 1:
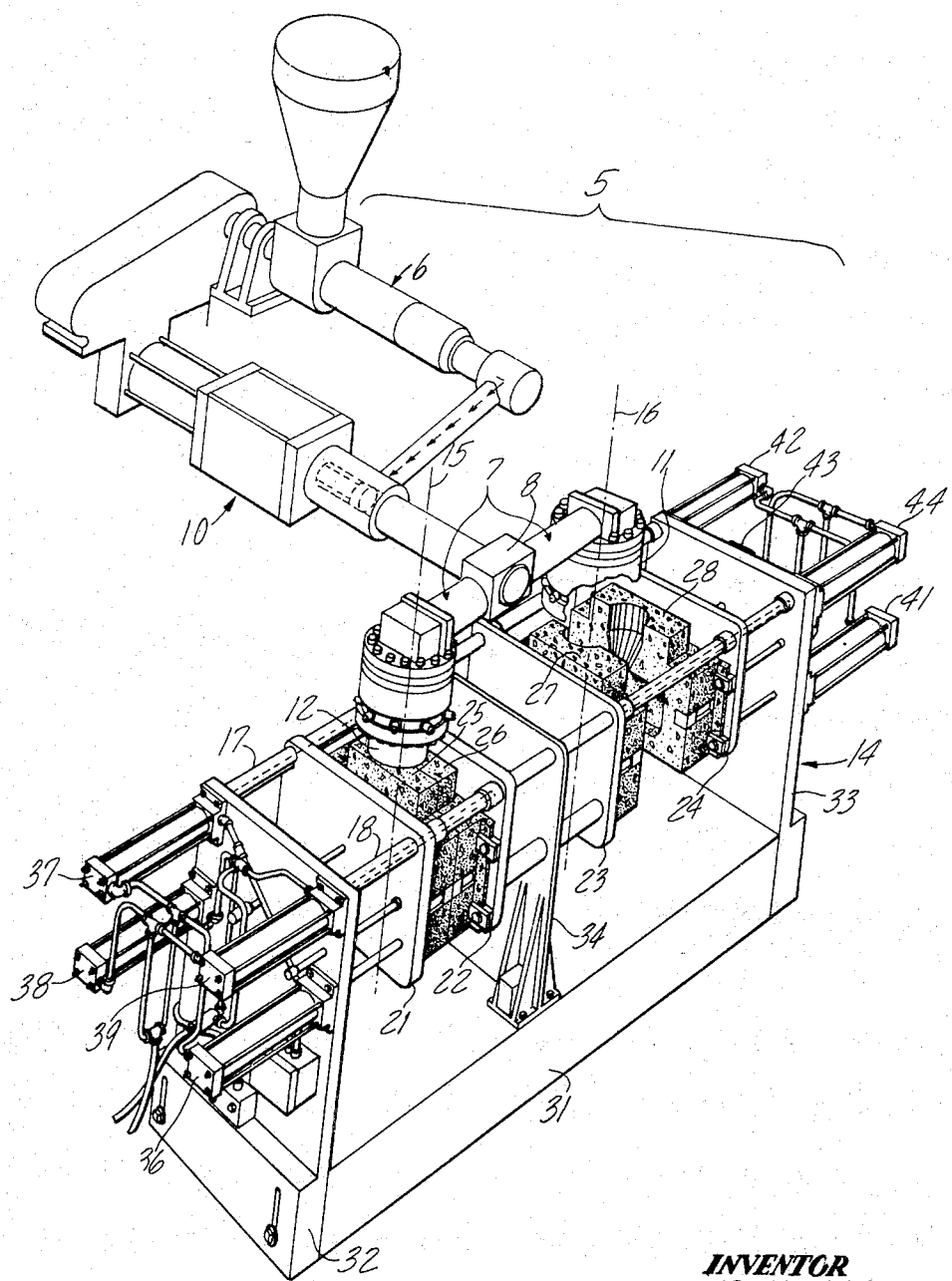
FIG. 1 is a fragmentary perspective view of portions of a blow-molding machine serving essentially to illustrate the structure of the mold-clamping unit in the foreground.

FIG. 1 is a general view of major components of a blow-molding machine 5 comprising a screw type extruder 6, a manifold 7 including a flow diverting valve 8, a hydraulic ram or accumulator 10 of conventional design for receiving and storing plasticized material received from the extruder, a pair of die heads 11 and 12 fixed to the bottoms of the rams of which a die head 12, and a blow-molding clamp unit 14 having elements thereof disposed for receiving parisons along two vertical axes 15 and 16.

The clamp unit 14 has parallel horizontal guide bars 17 and 18 and one set of platens 21 and 22 and another set of platens 23 and 24 slidably supported on the bars. The platens of each set reciprocate during operation toward and away from each other and the respective vertical die-head axis 15 or 16 along which the mold halves supported by the platens engage. As shown, the unit comprises mold halves 25, 26 supported by platens 21, 22 with opposed mold faces engaged along axis 15. Mold halves 27, 28 supported by platens 23, 24 are shown parted equidistantly from the axis 16. In another manner of speaking, each pair of mold halves engage along a vertical transverse plane containing axis 15 or 16, and, in the preferred manner of operation described below, the mold halves of each set back off from its respective plane of engagement simultaneously and equidistantly sufficiently for discharging a newly-molded article.

Other components of the press unit are a base 31, end frames 32, 33 and a center plate or frame 34 secured to the base. The end frames and the center plate support the bars 17 and 18 in parallelism. Additional components are fluid cylinders 36, 37, 38 and 39 supported in parallel coextensive relation with each other on the outboard face of the end frame 32, and cylinders 41, 42, 43, 44 supported in a similar manner on the outward-facing surface of the end frame 33. These cylinders are all of the double-acting type in order to obtain rapid platen movement in both directions.

The press also includes piston rods for connecting the platens with the pistons of respective actuating cylinders. For example, cylinders 36, 37 which reciprocate the platen 21 are connected therewith by piston rods 46, 47. Cylinders 38, 39 for reciprocating the platen 22 are connected therewith by piston rods 48, 49. As FIGS. 1 and 2 indicate, the piston rods connecting with the platen further away from the actuating cylinders therefor extend through openings in the nearer platen to permit free relative movement between the nearer platen and such rods. For example, the rods 48 and 49 are fastened to the platen 22 but are independently reciprocable in respect to the platen 21 through apertures 51 and 52 of the platen 21. At the other end of the clamp unit 14, platen 23 is connected with a group of cylinders 43, 44 by respective pistons rods with a group of cylinders 43, 44 by respective piston rods of the cylinders. In a similar manner, the platen 24 is connected with cylinders 41 and 42.

Further evident in FIGS. 1 and 2 is that axes of the two groups of coextensive parallel cylinders at each end of the clamp unit 14 are disposed within intersecting planes. For example, a plane containing the axes of cylinders 36, 37 is disposed in intersecting or X relationship with a plane containing the axes of cylinders 38, 39. A similar relationship exists at the other clamp unit between cylinder group 41, 42 and cylinder group 43, 44. This arrangement of the cylinders is exemplary of any which achieves substantially balanced forces on opposed engaged mold halves.

Mold halves 21, 22 engage for mold closing along a plane 55 located midway within a region of maximum separation of the mold halves 25, 26 during normal molding operation of cylinders 36 to 39. The mold halves 27 and 28 are similarly reciprocated with respect to another plane of engagement along axis 16 by respective cylinders 41 and 44.

Figure 5:
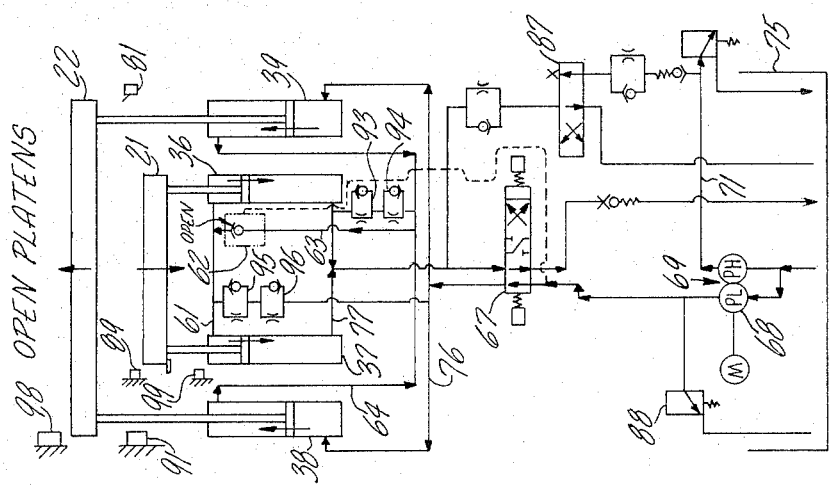
FIGS. 3, 4 and 5 are hydraulic diagrams illustrating three different stages of operation of a hydraulic system insofar as it affects one-half, i.e., one set of platens of the molding clamping unit.
Figure 4:
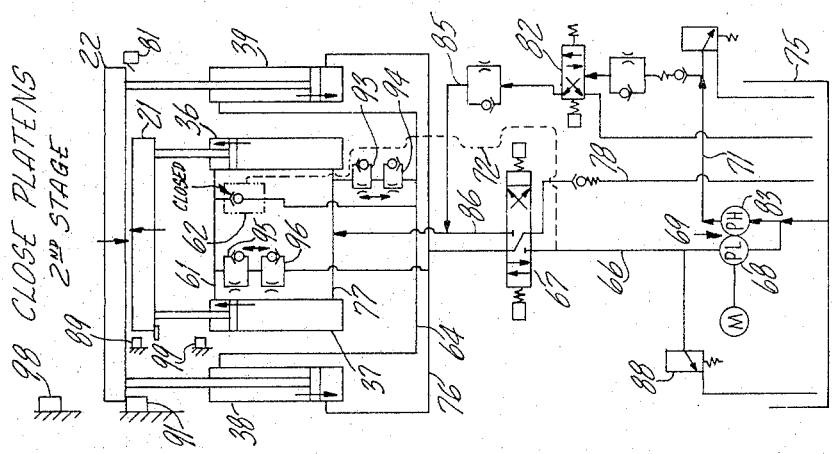
Figure 3:
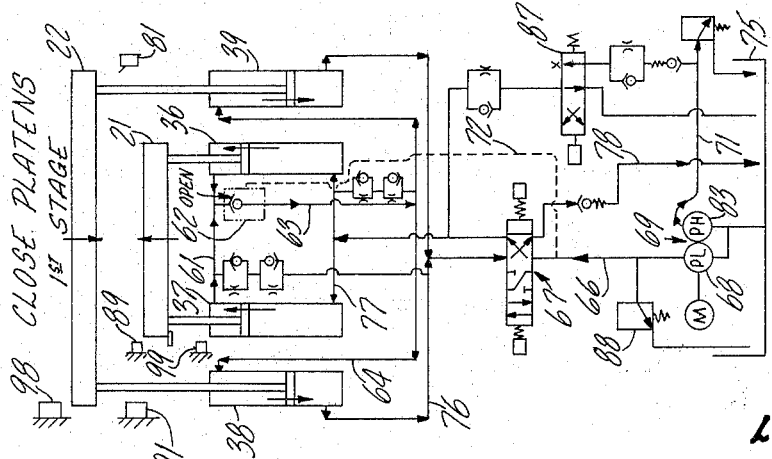

To facilitate the description, FIGS. 3, 4, and 5 are correlated with FIG. 2, i.e., the left side of the clamp unit 14 as viewed in FIG. 1. Thus FIGS. 3, 4, and 5 represent but one side of the clamp unit. As the hydraulic diagram depicted by these figures indicate that like ends of cylinders of the same functional group are connected to a common-fluid conducting manifold, such manifold may (1) connect with a manifold joining one set of like ends of the other functional group of cylinders or (2) it may connect with a flow-reversing valve which may be adjusted to connect alternately the manifold with either a pump or other source of fluid under pressure, or a fluid reservoir. The various platen-actuating cylinders are of the double-acting single-rod type and, as described herein, actuated by oil pumped alternately to the end, known herein as the "rod" end through which the piston rod reciprocates, or to the other end designated herein as the "head" end.

As FIGS. 3 to 6 indicate, the rod ends of cylinders 36, 37 are connected by a manifold 61 which is in turn connected through a pilot-operated valve 62 by lines 63 to a manifold 64 which connects the rod end of cylinders 38, 39. The check valve 62 is maintained as an open line on all occasions in which pressure exists in a line 66 leading to a three-position solenoid-operated four-port reversing valve 67 from the low pressure side 68 of a duplex pump 69 providing also relatively high pressure in a line 71. The valve 62 is connected with line 66 by a line 72. Significant pressure drop in the line 66 as hereinafter explained permits the valve 62 to operate as a check valve. Hence liquid is transferable between the rod ends of the cylinders for reciprocating the platens 21, 22 with the direction of fluid transfer depending on whether the platens are to be moved toward each other or apart.

It may be noted that during either an opening or closing stroke of the platens, liquid moves from the head ends of one group of cylinders to the reservoir while liquid enters the head ends of the other group of cylinders from the pump. To accomplish such movement of liquid, the head ends of cylinders 38 and 39 are connected by a manifold 76, the head ends of cylinders 36, 37 are connected by a manifold 77, and both manifolds are connected with the valve 67 which, as the diagrams indicate, may be positioned to supply liquid from the pump side 68 to either manifold while transferring liquid from the other manifold into the reservoir 75 through a return line 78.

FIG. 3 illustrates the hydraulic system in a stage of operation for closing the platens 21 and 22 wherein liquid is passed from the low pressure pump side 68 and through the valve 67 to the manifold 77 into the head end of cylinders 36 and 37. Liquid thereupon passes out of the rod ends of the cylinders to the manifold 61, line 62, manifold 64 and into the rod ends of cylinders 38, 39. Liquid thereupon passes outwardly of the head ends of cylinders 38, 39 through the manifold 76 through the valve 67 and the return line 78 to the reservoir 75. Because of the high volume output of the low pressure side of the pump 69, this stage of operation is characterized by an extremely rapid closing of the platens 21, 22 until the platens 21, 22 reach a stage of approachment disposing the mold halves supported thereby into a predetermined proximity of each other, e.g., a spacing in the range of one-quarter to one-eighth of an inch. This may be done by means of a switch placed along the path of one of the platens, such as switch 81 placed in an electrical circuit not shown which will actuate the valve 67 to its neutral position and also actuate a two-position four-port reversing valve 82 which places the high-pressure side 83 of the pump 69 in communication through lines 71, 85, 86 and the manifold 77 with the cylinders 36 and 37.

In addition to controlling valves 67 and 82, electrical circuitry is arranged so that the switch 81 also actuates a solenoid-controlled relief valve 88 which is opened as high pressure liquid is applied to cylinders 36, 37 from pump side 83 to allow low-pressure pump side 68 to discharge through the valve 88 into the reservoir. Pressure in the line 66 and, hence, the line 72 is lowered to a level enabling the valve 62 to function as a check valve. After application of a high-pressure liquid to cylinders 36, 37, the platen 21 comes to rest against a stop 89. In the final movement of the platen, liquid is free to flow from the rod ends of the cylinders 36, 37 through the check valve and into the rod ends of the cylinders 38, 39. In normal behavior, the platen 22 comes to rest against a stop 91 practically simultaneously with the arrival of platen 21 against the stop 89.

In the event that the platen 21 engages the stop 89 slightly before engagement of the platen 22 with the stop 91, flow control valves 93, 94 disposed in series relationship between the head-end manifold 77 of cylinders 36, 37 and the rod-end manifold 64 of cylinders 38, 39 permit a slight seepage or leaking of liquid from the manifold 77 to the manifold 64 to enable further movement of the platen 22 into engagement with the stop 91 after stoppage of platen 21 through the application of high-pressure liquid to the rod ends of cylinders 38, 39. Conversely, should the platen 22 engage its stop 91 first, platen 21 will move into engagement with its stop 89 as pressure is equalized in manifolds 64 and 77 through the valves 93, 94.

During the second stage of closure of the platens as illustrated by FIG. 4, if platen 22 should engage stop 91 before engagement of the platen 21 with the stop 89, the excess of liquid remaining to be discharged from the rod ends of cylinders 36, 37 will pass from the manifold 61 through flow control valves 95, 96 in series between manifolds 61 and 76. Since manifold 76 is connected by the valve 67 with the return line, such excess liquids return at low pressure to the reservoir 75. At this instant, liquid under pressure in the manifold 77 is prevented from passing into other manifolds and the return line by the restriction provided by the pilot operated check valve 62 now operative as the result of loss of pressure in the line 66.

To retract the platens 21 and 22, the reversing valves 67 and 87 are electrically operated to positions as shown in FIG. 5, and the solenoid relief valve 88 is deactivated to permit its normal pressure-regulating function in respect to the low pressure pump side 68 by timing mechanism and electrical circuitry well known to the art of process cycling. Assuming the pump 69 to be operating, the hydraulic system for operating platens 21, 22 will now retract the platens for the purpose of separating mold halves in the discharging of a molded article therefrom. The diagram of FIG. 5 shows that the high-pressure side of the pump is blanked off from communication with the manifold by the valve 87 and high-pressure liquid is recycled to the reservoir 75. The low-pressure pump side 68 is now in communication through the valve 67 with the manifold 76 which feeds liquid to the head ends of cylinders 38, 39. In reverse to the manner shown by FIGS. 3 and 4, the liquid now flows through the manifold 64 from the rod ends of cylinders 38, 39 to the rod ends of cylinders 36, 37 by way of line 63, valve 62 now pressured through line 72 to an open condition, and manifold 61.

To limit movement of the platens during the opening stroke, stops 98 and 99 are provided for platens 21 and 22, respectively. In the event that the platen 22 engages the stop 98 before the platen 21 has completed its return stroke into engagement with the stop 99, liquid ceases to enter the head ends of cylinders 38, 39 and may now bleed through the flow-regulating valves 95, 96 to enter the manifold 61 and the rod ends of cylinders 36, 37 until the platen 21 has completed its travel into engagement with the stop 91. As the diagram of FIG. 5 indicates, liquid is free to return from the head ends of cylinders 36, 37 through the manifold 77, the valve 67, and the return line 69 to the reservoir 75.

If the platen 21 engages the stop 99 before engagement of the platen 22 of the stop 98, the excess liquid which needs to escape from the rod ends of the cylinders 38, 39 passes from the manifold through the control valves 93, 94 into the manifold 77 and hence through the valve 67 back to the reservoir.

The above description of the operations of the hydraulic system makes apparent the importance of the flow control valves 93, 94, 95 and 96 in bringing about registry of the platens with respective stops in completing each stroke. Through provision of these valves, it is possible to precisely correct the positions of the platens to a proper point for beginning each stroke. In this manner, the hydraulic mechanism of the molding machine is self-correcting with regard to slight geometric imperfections in the construction of the cylinders or other parts of the clamp unit. These valves also make it practical to utilize relatively large volumes of liquid at relatively low pressure for all of the movement of the platens except for a small increment of movement needed to close and retain the platens in engaged relationship at the high pressures necessary to withstand blow-molding pressures.

FIG. 6 illustrates essentially the hydraulic system of FIGS. 3 to 5 in combination with additional mechanism required for operating a clamp unit comprising two pairs of platens arranged as shown in FIG. 1 to mold and discharge molded articles in alternate timed relationship. Obvious from FIG. 6 is that the apparatus for operating platens 23, 24 including cylinders 41 to 44, the various manifolds, and the lines associated therewith are counterparts of the system described above with respect to FIGS. 3, 4 and 5. FIG. 6 further illustrates hydraulic circuitry such as is used to operate the three-port two-way valve 8 which may be shifted to either of two positions to feed the product of the extruder 6 into one or the other of the branches of the manifold 7 to the die heads 11 and 12. As shown, by way of example, a double-acting cylinder 101 is connected with a rotary plug 102 of the valve 8 with a cylinder arranged to be operated by a three-position four-port solenoid-operated valve 104 connected with the high pressure side 83 of the pump through lines 105 and 71, and with the reservoir 75. The operation of this valve is correlated in timed relation with the electrical operation of valves 67 and 107, and the various other valves described hereinbefore whereby the valve 8 is shifted from one position to the other for alternately feeding the die heads 11 and 12.

What is claimed is:
1. A molding machine comprising:
 an end frame;
 guide means anchored to said frame and projecting therefrom in a fixed direction;
 a pair of relatively opposed platens mounted on the guide means in slidable relation therewith;
 a pair of mold sections having opposite faces at right angles with said fixed direction mounted on said platens to be carried thereby into engagement to close the mold along a predetermined plane;
 first fluid-cylinder means mounted on said member including push rod means extending in said direction connecting said cylinder means and one of said platens;
 second fluid-cylinder means mounted on said member disposed in coextensive parallel relation with said first cylinder means and comprising second push rod means connecting said second cylinder means with the other platen; and
 fluid-supply means, fluid conducting means connecting both cylinder means and the supply means, and con- trol means associated with the conducting means providing simultaneous movement of the platens with associated mold sections in opposite directions, said supply means and control means being arranged and coordinated to bring said mold sections together along said plane.

2. A molding machine including a blow-molding clamp unit comprising:

an end frame and a plurality of coextensive parallel guide bars projecting in a horizontal direction from spaced portions of the frame;

a pair of platens mounted slidably on said bars;

a pair of mold sections carried on said platens on the sides thereof facing each other, said sections having opposing faces which engage to close the mold along a plane at right angles with the length of the guide bars;

a plurality of coextensive fluid cylinder and piston assemblies mounted on said end frame in parallel relation with said bars, said assemblies being substantially equally divided into two groups with respect to force-transmitting capacity.

one group having piston rods extending from respective pistons to the nearer platen, the other group having piston rods extending from its respective pistons past the nearer platen into attachment with the further platen in independently movable relation with the nearer platen;

said assemblies and rods of each group being distributed along a vertical transverse plane to impose substantially balanced forces on respective associated platens in said direction, said platens being movable by respective assemblies between separated positions and a plane intermediate of said positions whereat said faces engage; and fluid-supply means, fluid-conducting means inter-connecting said supply means and said assemblies, and control means associated with said conducting means for circulating fluid between said groups and said supply means to produce simultaneous movement of the platens and associated mold sections in opposite directions alternately toward and away from said plane.

3. The molding machine of claim 2 comprising:

a pair of parison-forming die heads horizontally spaced to discharge a parison from each along said plane and a second vertical plane parallel therewith and the clamp unit comprises:

a second end frame attached to said guide bars at the end of said unit remote from said named end frame;

a second pair of platens and a mold section attached to each, said second set of platens and mold sections being supported on said bars at opposite sides of said second vertical plane in an arrangement similar to that of said first-named platens and mold sections; said bars being of sufficient length to provide separating travel of the mold sections of each pair away from its respective said vertical plane through a distance at least equal to that dimension of the mold cavity lengthwise of said bars; and a second plurality of cylinder and piston assemblies mounted on the second frame in parallel relation with said bars and divided into two substantially equal groups with respect to force transmitting capacity, said second plurality of assemblies being connected with the second set of platens in an arrangement similar to that defined with respect to the first-named assemblies and the first-named pair of platens, each plurality of assemblies being mounted on the outboard side of its respective end frame.

4. The molding machine of claim 3 comprising plastic supply means for forcing an extrudable plastic material through said die heads, and valve means associated with the plastic supply means for alternately feeding said material to said die heads; and the control means comprises means connected with said valve means correlating the operation thereof with platen movement to enable issuance of a parison from one of said die heads during a condition of the pair of mold sections disposed thereunder contemporaneously with a closed condition of the other pair of platens and mold sections wherein a blow-molding operation may be accomplished.

5. The molding machine of claim 2 wherein:

the longitudinal axes of one group of assemblies are contained approximately in a plane in crosswise relation with a plane containing the axes of the other group.

6. The molding machine of claim 2 wherein:

said control means is arranged and constructed and interrelated with said supply means and conducting means to terminate movement of each associated platen and mold section toward the other associated platen and mold section at said plane.

7. The molding machine of claim 2 wherein:

the cylinders of said assemblies are double-acting and each cylinder has a head end and a rod end; and said fluid-conducting means and control means, in order to effect platen confrontation, connect all like ends of the cylinders of a first group of said assemblies with the supply means, the other like ends of said first group of cylinders to like ends of the cylinders of the other or second group of assemblies, and the other like ends of the second group of cylinders to fluid-collecting means.

8. The molding machine of claim 7 wherein:

portions of said fluid-conducting means extending from said other ends of said first group are merged for collective distribution to said first-named ends of the second group.

9. The molding machine of claim 7 wherein:

the cylinders of both groups are of equal displacement per unit length of stroke whereby said one group of cylinders meter liquid to said other group to impart equal travel of both platens during the closing stroke.

10. The molding machine of claim 7 wherein:

said fluid-conducting means and control means comprises valves actuatable from one position to another to effect separating movement of said platens by connecting the supply means with said other like ends of the second group, and connects the first-named ends of the first group with collecting means, said change of valve position being accompanied by reversed travel of fluid through conducting means portions connecting other like ends of said first group to first-named like ends of the second group.

11. The molding machine of claim 7 wherein:

said fluid-conducting means is arranged for fluid transmission directly from the supply means to the head ends of the cylinders of said one group, directly from the rod ends of said one group to the rod ends of said other group, and from the head ends of said other group to fluid-collecting means during a mold-closing stroke.

12. The molding machine of claim 11 wherein:

the cylinders of both groups are of equal displacement per unit length of stroke whereby said one group of cylinders meter liquid to said other group to impart equal travel of both platens during the closing stroke.

13. The molding machine of claim 9 wherein:

the fluid-supply means comprises a high-pressure source and a relatively low-pressure source; and the control means comprises:

(1) a three-position four-connection reversing valve having two ports blocked and two ports connecting said other like ends of the second group with fluid-collecting means at neutral position disposed between a first line to said low-pressure source and a second line to said collecting means at one side of the valve and, on the other side, a third line to said first-named cylinder ends of said first group and a fourth line to said other ends of the second group;

(2) a two-position four-connection reversing valve disposed between and connecting with a fifth line connecting with said first line on one side and, on its other side, a sixth line to said high-pressure source, and a seventh line to fluid-collecting means; and (3) actuating means for shifting said three-position valve from its position connecting said first line with the third line to its neutral position and simultaneously shifting the two-position valve to its position connecting the sixth line with the fifth line, said actuating means responsive to signal means on reaching a predetermined point within the mold closing stroke of the clamp unit.

14. The molding machine of claim 13 comprising: stop means defining the limits of travel of both platens.

15. The molding machine of claim 13 comprising: stop means defining the limits of travel of both platens; pressure-equalizing means connected between said first-named ends of said first group and said first-named ends of the second group; and pressure-relief means connecting said other ends of the first group in communication with said fluid-collecting means.

16. The molding machine of claim 15 wherein: said pressure-relief means connects with said fourth line.

References Cited

UNITED STATES PATENTS 3,063,092  11/1962  Fischer.
3,222,717  12/1965  Saslawsky et al. ___ 264—98 XR THERON E. CONDON, Primary Examiner H. A. KILBY, JR., Assistant Examiner U.S. Cl. X.R.

264—98